VICTOR R. HUEBNER
INVENTOR.

BY T E Kristofferson
ATTORNEY

United States Patent Office 3,486,298
Patented Dec. 30, 1969

3,486,298
METHOD FOR THE CONCENTRATION OF TRACE IMPURITIES IN GASEOUS MEDIA BY ABSORPTION
Victor R. Huebner, Fullerton, Calif., assignor to Beckman Instruments, Inc., a corporation of California
Filed June 30, 1967, Ser. No. 650,487
Int. Cl. B01d 15/08
U.S. Cl. 55—67                                    6 Claims

ABSTRACT OF THE DISCLOSURE

An improved method of concentrating impurities to improve analytical sensitivity using porous polymer beads to absorb trace contaminants. The specification also illustrates a system for employing the method and an example using the concentrator in a gas chromatography application. One embodiment of a structural arrangement for a concentrator is also illustrated.

BACKGROUND OF THE INVENTION

The present invention relates to a method of concentrating impurities in a gaseous media in order to obtain improved analytical sensitivity, and more particularly, to such a method employing the absorption phenomena and porous polymer beads.

Present analytical equipment, such as mass spectrometers or gas chromatographs, require a definite quantity of a compound before it can be detected. This quantity commonly is referred to as the "minimum detectable quantity" or "ultimate sensitivity." A number of applications, especially in the field of toxicology, require the detection, identification, and quantitation of compounds present at lower than normally detectable limits. When compounds must be analyzed at these very low concentration levels, a sample concentration step must be employed.

Cryogenic trapping is a well known and commonly used technique for concentrating impurities in air. In this method, a metal tube is maintained at a very low temperature ($-77°$ C. is commonly employed). The air sample is passed through this trap at a known rate for a measured period of time. Higher boiling point contaminants are liquefied or frozen on the inner surfaces of the trap. Subsequent heating of the trap permits vaporization of these compounds into the analytical instrument. This system thereby permits concentration of the trace contaminants so that a relatively large concentration of the contaminants is now contained in a relatively small quantity of gas. One of the major disadvantages of this system is that a certain proportion of the trace contaminants do not come in contact with the cooled walls and thereby are lost with the gaseous medium. Thus, quantitative results are very difficult to achieve, especially with more volatile compounds. Another disadvantage of this method is that conventional thermoelectric devices are unable to supply adequate cooling capacity, thereby making it difficult to adapt this method to automated equipment.

In another method of concentration, the trap is filled with absorbent material such as charcoal or silica gel. This method permits quantitative trapping of most compounds to be achieved at room temperature ($25°$ C.). The extremely high absorptivity of these materials also require a very high temperature ($200°$ C.) for subsequent release of the compounds. A large number of compounds (acids, alkaline gases, alcohols, etc.) cannot be quantitatively eluted at any temperature below their decomposition temperature, however. Absorption involves the adhesion in a thin layer of molecules to the surfaces of solid bodies.

The phenomenon of absorption, as used in gas chromatography, appears to be the best principle for quantitative concentration of trace impurities in gaseous media. Absorption, as applied to concentration, requires solution of the trace impurities in a stable liquid phase followed by elution just prior to analysis. The rate of elution is dependent on temperature, approximately doubling for each 15–20° C. increase in temperature. During concentration, it is desirable to have a slow rate of elution, whereas during the release prior to analysis it is desirable to have a high rate of elution. This can be achieved by a low temperature during concentration followed by a higher temperature after concentration is complete. In absorption, the molecules are taken up by the absorbent like a sponge and are not confined to the surface thereof.

Although the theoretical advantages of utilizing absorption for concentration are well-known, practical problems of handling the permanent liquid phase have prevented its use in this application. The layering of a liquid phase on the inner surfaces of a tube will not provide a high trapping capacity unless extremely low temperatures are used since the quantity of liquid phase that may be applied is very small. If an inert surface area increasing material such as Teflon particles are used to hold the liquid phase, the trapping capacity will still be very low. This is due to the fact that the quantity of liquid phase that can be effectively coated on the Teflon surface is limited to no more than 10% of the weight of the Teflon. As much as 50% liquid phase coating may be applied to the surface of diatomaceous earth particles. Although this will greatly improve trapping capacity, the highly active surface of diatomaceous earth particles will induce undesirable absorption effects, especially with the more reactive types of trace contaminants.

The Dow Chemical Company, Freeport, Texas, has recently synthesized porous polymer beads. This material is marketed by Waters Associates, Inc., Framingham, Massachusetts, under the registered trade name of Poropak®. This material is available in a variety of different types and sizes as an absorbent type of partitioning material for gas chromatographic column separations. As such, it provides much greater retention of higher molecular weight materials than any other absorbent column operated under comparable conditions. This is probably due to 100% of the material acting as a liquid phase. Since this material is a relatively rigid solid, no inert support material is required. The extremely inert nature of this material permits quantitative elution of highly reactive compounds. This material thereby possesses the ideal requirements for concentration by absorption and thereby makes this concentration technique feasible.

SUMMARY OF THE INVENTION

Accordingly, it is one object of this invention to provide an improved method of concentrating trace impurities in a gaseous media.

Another object of the invention is to provide such a method using the absorption characteristics of porous polymer beads.

These and other objects are achieved by providing a method of concentrating trace contaminants in gaseous media, including the steps of passing the media over an absorbent material contained in a trap in one direction for a time sufficient to trap an amount of the contaminants to obtain a desired analytical sentitivity in associated instrumentation, and reversing the direction of flow in the trap for eluting and backflushing the contents of the concentrated trace contaminants in the trap into the associated instrumentation with minimal peak spreading.

In another embodiment, the trap may be cooled or held at ambient during the step of concentrating and subsequently heated during the step of eluting.

The novel features which are believed to be characteristic of the invention are set forth with particularity in the appended claims. The invention, and further objects and advantages thereof, can best be understood by reference to the following description and accompanying drawings.

DESCRIPTION OF THE PREFERRED EMBODIMENT

Many applications require the detection and quantitation of all trace contaminants in air which have volatilities less than or equivalent to those of the Freons. It was experimentally established that a two foot long by 0.093 inch column packed with Poropak T would completely retain Freon 22 or high molecular weight components for 10 minutes when operated at 0° C. with a flow rate of 20 ml./min. Consequently, 100% trapping could be expected for all normal trace contaminants in air. This trap was used with a thermal conductivity gas chromatograph and a sample containing 50 p.p.m. acetone in helium. The sample was allowed to flow through the trap at a rate of 20 ml./min. for five minutes while the trap was maintained at 0° C. The trap was then heated to 90° C. and the absorbed materials were allowed to enter the gas chromatograph. The acetone peak obtained in this manner was 68 times as high and 1.5 times as broad as when a 1.0 ml. aliquot of the sample was injected without concentration. No peak tailing (indicative of adverse adsorption effects) were evident.

These preliminary experiments show that it is extremely feasible to obtain a high degree of concentration by absorbing trace contaminants in gaseous media on Poropak beads while they are maintained at a low temperature (0° C. in this case). Quantitative desorption is easily attained by subsequent heating of the trap (90° C. in this case). The polymer material may be polystyrene, polyethylene, polyvinylchloride or any other such material.

Figure 1:
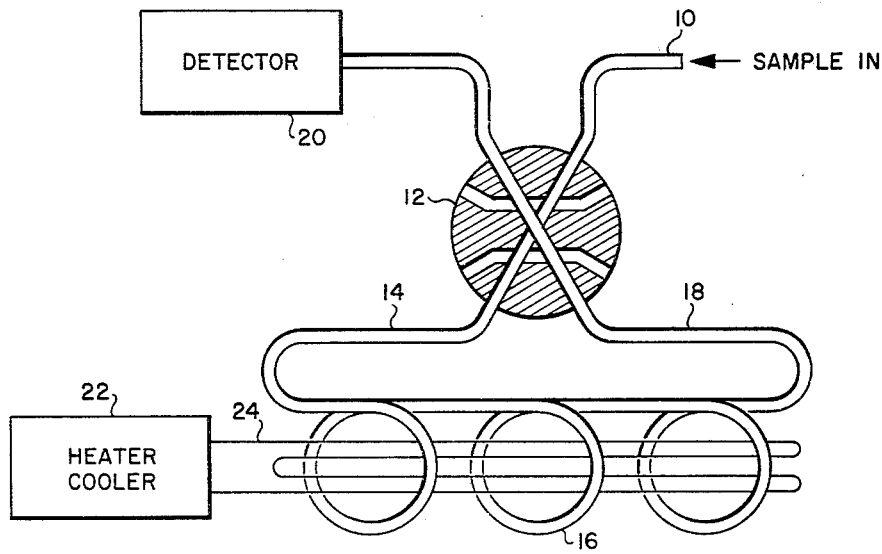
FIG. 1 is a block diagram of a system embodying the method of the present invention.

Turning now to the drawings, in FIG. 1 an embodiment of apparatus which may be employed for carrying out the invention is illustrated. The sample, or the gas containing the trace contaminants is allowed to enter the conduit 10 and flow through the valve 12, down through the left-hand conduit 14, leading into the trap or concentrator 16, and out through the conduit 18, back through the valve 12 to the detector 20, which may be for example a thermal conductivity detector or even an entire analytical instrument such as a gas chromatograph. The heater-cooler 22 over the coils 24 serves to alternately cool and heat the trap 16, cooling it during absorption and heating it during elution. After collection of trace impurities is complete, the valve 12 is rotated and the heater 22 is activated. The sample gas now flows into the conduit 10 through valve 12 into conduit 18 and through the heated trap 16, thereby eluting and backflushing the impurities trapped therein. The concentrated impurities emerge from conduit 14, and flow through valve 12 into detector 20 as a concentrated mass.

Figure 2:
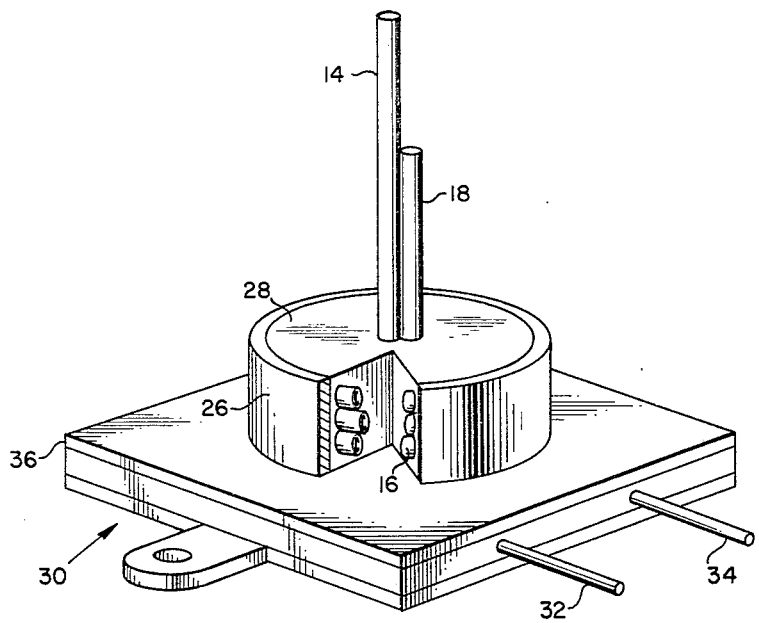
FIG. 2 is an isometric drawing of one configuration which the trace contaminant concentrator of the present invention might take; and, FIG. 3 illustrates three chromatograms showing no concentration on a one milliliter sample, 50 milliliters concentration using an absorption temperature of 0° C. and an elution temperature of 100° C., and 50 milliliters concentration using an absorption temperature of 25° C. and an elution temperature of 100° C. for comparative purposes to demonstrate the advantages of the invention, as adapted to an embodiment utilizing a gas chromatograph.

FIG. 2 illustrates in more detail an embodiment employing specific structure for heating and cooling the trap 16 of FIG. 1. The numerals used are the same where the components are the same as those illustrated in FIG. 1. The conduit 14 leads down and into the trap 16, and the conduit 18 up and away therefrom. The trap 16 is encased in a heater blanket 26 containing the sample heater which may be encased in the material 28 along with the trap 16. A thermoelectric module 30, having an inlet 32 and an outlet 34, may be employed for cooling the trap 16 during absorption. The heater contained in material 28 is employed to heat the trap 16 during elution. One method which obviates the need for the thermoelectric cooler 30 would utilize heat only, programming the sample trap temperature to 115° F. and maintaining this temperature while sample collection is taking place. Following this, the loop temperature is rapidly increased to 295° F. for example. A second method would cool the sample loop to 32° F. and maintain it there during sample collection, raising the temperature to 212° F. as sample injection is made. The power requirements would be considerably less if no cooling step were employed and the results obtained by programming the sample loop temperature between 115° and 295° F. are entirely adequate for many applications.

Selection of operating temperatures for the collection mode are determined by the lowest dependable operating temperature available under high ambient conditions, for instance, 110° F. Thus, the sample concentrator 16 must be located near the cooling plate 36 of the thermoelectric module 30, yet not directly on it, to avoid a massive heat drain when heating to 295° F.

Considering an application in which the detector 20 of the system of FIG. 1 has been replaced by a gas chromatograph, to illustrate in more detail the advantages of the invention, a requirement of the system to have a comfortable margin of safety was concentration by at least a factor of 50.

Concentration, as used in gas chromatography, entails trapping the less volatile trace contaminations and discarding the more volatile bulk gases prior to analysis. This process generally is affected by concentrating at a low temperature followed by injection into the column at a much higher temperature. Brute force techniques, such as cryogenic trapping in an empty tube, are common. Often it is desirable to avoid using liquid nitrogen or other low temperature coolant. The alternative of using a thermoelectric cooling device involves a difficulty in obtaining a temperature differential greater than 50° C., for instance, a cooling temperature of −10° C. with an ambient of 40° C. Unfortunately, many compounds of interest might be lost at a cold temperature of −10° C. This brute force technique would be marginal for most of the more volatile compounds; however, the basic principle of cooling followed by heating can be effectively utilized at a higher temperature if a packed sample loop, such as disclosed herein, rather than if an empty sample loop is used. Thus if a retarding medium is used in a sample loop, quantitative collection of the trace contaminants can be achieved at much higher temperatures eliminating the requirement for drastic cooling. Poropak beads not only have the greatest known capacity and degree of retardation of the available absorbent materials, but are completely non-reactive and extremely stable.

A cooling temperature 0° C. is attainable, which is a conservative value. A concentration factor of 50 is desired and a cooling time of the sample of five minutes is available. A flow rate of 10 milliliters a minute is employed.

The minimum size of the concentration trap 16 to be employed can be determined by the size at which the most volatile compound of interest is just barely completely retained. Larger volume devices do not alter the operating characteristics, but do require more power for heating and cooling. The cross-sectional size of the concentration trap 16 is determined by the required flow rate and the available pressure dicerential. Accordingly, an 18 inch long, 0.062 inch I.D. column packed with Poropak was selected. The length or diameter can be reduced if it is found that these dimensions are too conservative.

For actual operation, there are several temperature level options available. In one embodiment of the method, the concentration trap can be cooled at 0° C. by a thermoelectric device. The sample will be allowed to flow through at a predetermined rate of 10 milliliters per minute for 5.0 minutes, and then the concentrator will be heated to 100° C. while its contents are eluted and backflushed into the partition column. During concentration, the most volatile compounds will penetrate almost the entire length of the concentrator tube, while the least volatile compounds will penetrate only a short distance. After eluting and backflushing at the higher temperature, all compounds will be "regrouped" into an essentially single peak. It is necessary to backflush to get sharp peaks, as eluting out of the original trap exit will spread the sample extremely. This process necessarily tends to create broader elution peaks which decrease column resolution. In general, the peak width from any column is the summation of peak broadening effects attributable to the column itself, the injection time, and injection diffusion characteristics. In order to provide the best resolution, it is desirable to keep these peak broadening effects as small as possible. In this application, the peak broadening effects of the associated chromatograph columns are relatively fixed, since the analysis time, helium flow rate, and operating temperature are relatively fixed. It is of interest, however, to examine the additional peak broadening effects imposed by the concentration system.

In conventional injections of gaseous samples, the peak broadening effect is simply the effective sample size divided by the helium flow rate. If a 1 milliliter sample loop were used with a helium flow rate of 5 milliliters per minute, the peak broadening effect will be 12 seconds.

The peak broadening effect of the proposed concentration technique will be approximated by the following equation:

Peak broadening effect =

$$\frac{\text{Total effective sample size}}{2\left(\frac{\text{Differential temperature}}{15}\right) \times \text{helium flow rate}} \quad (1)$$

It may be seen that the peak broadening effect is directly proportional to the total effective sample size since higher sample throughput volumes necessitate deeper penetrations into the concentrator and correspondingly longer elution times.

Since the elution time is inversely proportional to helium flow rate, it also affects the peak broadening effect. In this application, the helium flow rate is limited to 5 milliliters per minute. Since the peak broadening effect is inversely proportional to the number "2" raised to the power of the differential temperature divided by 15, it is highly important to maintain as large a temperature differential as possible. The concentration temperature is limited by available heat sink temperatures for the thermoelectric devices to approximately 0° C. The elution temperature may be limited to approximately 100° C. if thermoelectric devices are used (the maximum safe operation temperature). If these values are inserted in the preceding equation, we obtain:

Peak broadening =

$$\frac{50}{2^{\frac{100}{15}} \times 5} = \frac{50}{100 \times 5} = 0.10 \text{ min.} = 6 \text{ sec.} \quad (2)$$

This peak broadening is less than would be expected for direct injection of a 1 milliliter sample.

Another mode of operation would eliminate the thermoelectric cooler. In this case, concentration at 40° C. (ambient temperature) followed by elution at 140° C. would give the same amount of peak broadening. An alternate approach would be concentration at 40° C. followed by elution at 100° C. In this case, peak broadening, according to Equation 1, would be increased to 37.5 seconds. Even this amount of peak broadening may be considered feasible as the results in FIG. 3 indicate useful peak forms.

Figure 3:
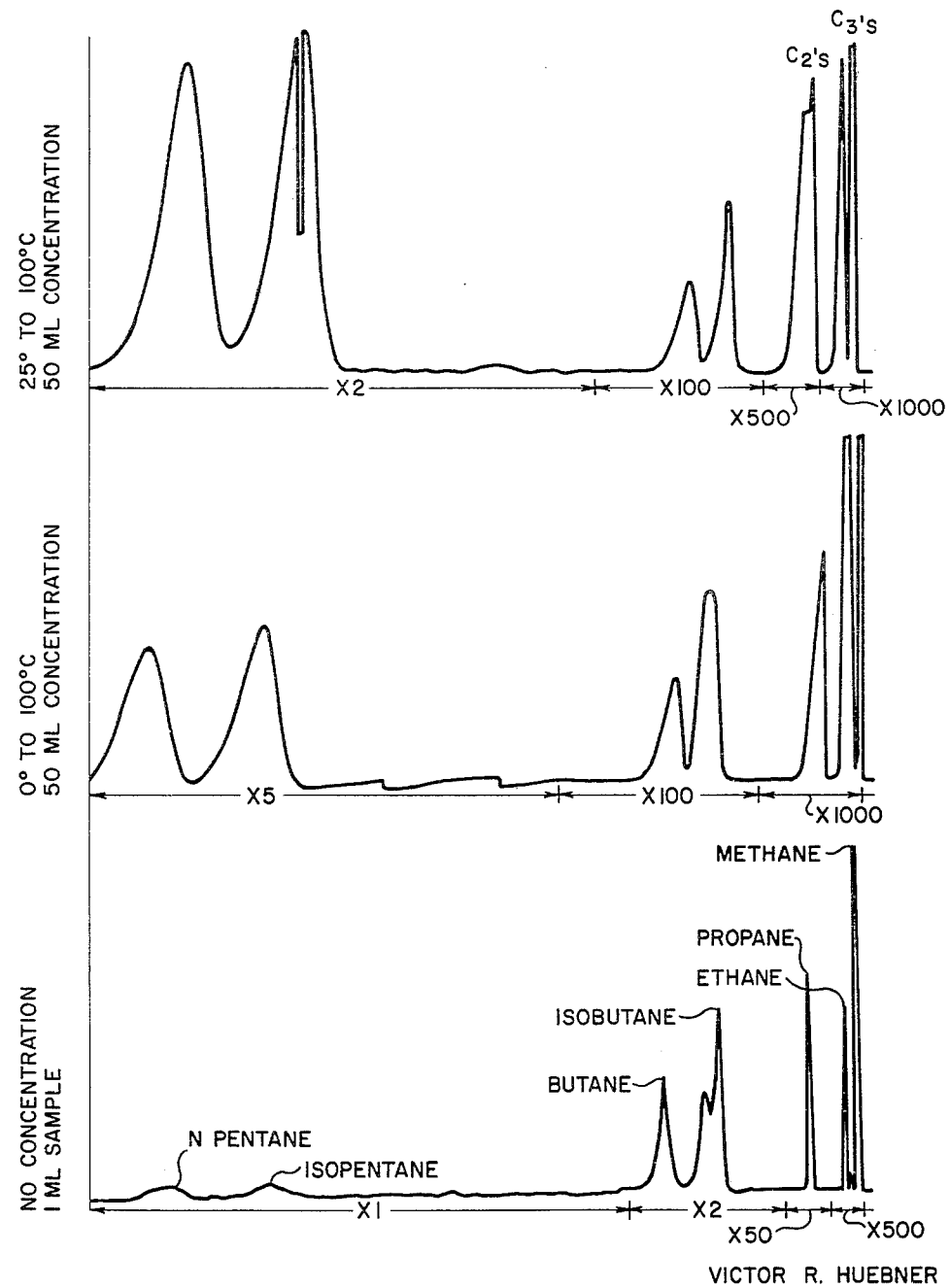

In preliminary tests made with this concentration technique, the peak height enhancement and peak broadening effected by this technique was found to closely agree with theory. A typical test is shown in FIG. 3. All tests were made with a Beckman GC–5 instrument using a thermal conductivity detector, a 6 foot x ⅛″ O.D. Poropak T column, and a helium flow rate of 20 milliliters per minute. The concentrator consisted of an 18 inch length of ⅛″ O.D. tubing filled with Poropak T. Concentration temperatures of 0° C. were obtained with an ice bath, while elution temperatures of 100° C. were obtained with a boiling water bath.

The lower chromatogram in FIG. 3 represents the separation of compounds in one milliliter of natural gas. The middle chromatogram was obtained by flowing 50 milliliters of natural gas through the concentrator at 0° C. followed by injection and heating the concentrator to 100° C. The upper chromatogram was obtained in the same manner except that concentration of the 50 milliliters of natural gas was performed at 25° C. instead of 0° C.

The butane, isobutane, pentane, and isopentane peaks are almost exactly 50 times as high as a result of concentration at either 0° C. or 25° C. (Noting the attentuation as indicated along the abscissa.) This indicates that concentration efficiency is essentially 100%, as expected, for compounds having the same or less volatility as butane. The fact that this concentration method works so effectively greatly reduces the load imposed on the detectors and columns. The concentration of pentane and isopentane in natural gas is approximately 40 p.p.m. Since these peaks, after concentration, are at least 200 times the noise level, even a thermal conductivity detector is capable of detecting less than 1 p.p.m. (3 mg./m.$^3$). The propane and ethane peaks are less than the calculated height, especially in the 25° C. concentration run. This is undoubtedly due to portions of these compounds passing completely through the concentrator and being lost. This could be eliminated by increasing the length of the trapping column if necessary.

It can be seen that some minor changes in retention time are occurring as a result of concentration (compare the isobutane region of concentrated versus unconcentrated samples). This effect can be explained by the fact that backflushed components do not emerge as a single peak. Some separation usually is effected in the backflushed trapping column as a result of changes in the column pressure gradients. This partial separation may or may not enhance the resolution effected by the partitioning column itself. This effect is relatively small and is completely inconsequential for this application since the backflushed concentrator always will be used. The columns can, therefore, be optimized by using this phenomena to advantage.

The peak broadening effect is almost exactly as calculated theoretically. It may be seen that this effect is relatively small, even when concentration is performed at 25° C. Although this effect does not appear to be a serious problem, the chromatographic instrument will be designed to provide as great a temperature change between concentration and elution as possible in order to minimize peak broadening.

What is claimed is:
1. A method of concentrating trace components in gaseous media including the steps of, passing the media over an absorbent material contained in a trap retained at a predetermined low temperature in one direction for a time sufficient to trap an amount of the trace components to obtain a desired analytical sensitivity in associated instrumentation, and reversing the direction of flow in the trap and substantially raising the temperature of the trap to a predetermined higher temperature while eluting and backflushing the contents of the concentrated trace components in the trap into the associated instrumentation with minimal peak spreading.

2. The method of claim 1 where the absorbent material is porous polymer beads.

3. The method of claim 2 including the step of venting the output of the trap during trapping at the low temperature.

4. The method of claim 3 including the step of connecting the side of the trap acting as the input during trapping to the associated instrumentation during elution.

5. The method of claim 2 including the steps of maintaining the trap at ambient temperature during trapping and raising the temperature of the trap at least 50° C. during eluting.

6. The method of claim 2 wherein the trap is first cooled with a thermoelectric device to a temperature as low as 0° C.

References Cited

UNITED STATES PATENTS

| | | | |
|---|---|---|---|
| 3,030,798 | 4/1962 | Lichtenfels | 55—197 X |
| 3,043,127 | 7/1962 | De Ford et al. | 55—67 X |
| 3,057,183 | 10/1962 | De Ford | 55—67 |
| 3,201,922 | 8/1965 | Villalobos | 55—197 X |
| 3,347,020 | 10/1967 | Van Venrooy | 55—67 |

OTHER REFERENCES

Baker et al., "Multiple Columns In Chromatography," Control Engineering, January 1961, pp. 77–81.

JAMES L. DeCESARE, Primary Examiner